United States Patent [19]

Lörcks et al.

[11] Patent Number: 4,552,918

[45] Date of Patent: Nov. 12, 1985

[54] FLAME RESISTANT STARCH-SULFAMATE PRODUCTS

[75] Inventors: Jürgen Lörcks, Rees-Bienen; Peter Obradovic, Kleve-Rindern; Peter Hochbahn, Kleve; Hermann Feeser, Norderstedt, all of Fed. Rep. of Germany

[73] Assignee: CPC International Inc., Englewood Cliffs, N.J.

[21] Appl. No.: 616,865

[22] Filed: Jun. 4, 1984

[51] Int. Cl.$^4$ .............................. C08L 3/00; C08J 3/02
[52] U.S. Cl. ...................................... 524/734; 524/52; 260/DIG. 24
[58] Field of Search ............................ 524/47, 52, 734; 260/DIG. 24; 106/210, 213; 527/313, 314, 315; 525/54.26; 536/118, 122

[56] References Cited

U.S. PATENT DOCUMENTS

| | | | |
|---|---|---|---|
| 2,142,116 | 1/1939 | Cupery | 106/18.21 |
| 4,139,699 | 2/1979 | Hernandez et al. | 106/213 |
| 4,339,491 | 7/1982 | Lauterbach et al. | 428/317.7 |

*Primary Examiner*—John Kight
*Assistant Examiner*—Nathan M. Nutter

[57] ABSTRACT

Gelatinized starch is reacted with sulfamate at elevated temperature in an aqueous medium to give a flame resistant starch-sulfamate product. Suitable sulfamates include alkali-sulfamates and alkaline earth sulfamates. The amount of sulfamate used can be in the range of 3 to 40 percent by weight, based on starch dry substance. Minimum water content of the reaction mixture is about 30 percent by weight. Reaction temperatures are from about 40°–250° C. The starch-sulfamate products are useful as fillers, thickeners and binders, among other things.

24 Claims, No Drawings

FLAME RESISTANT STARCH-SULFAMATE PRODUCTS

BACKGROUND OF THE INVENTION

1. Field of the Invention

The present invention relates to flame resistant starch-sulfamate products, a process for manufacturing them and their uses.

2. The Prior Art

It is well known that starches and modified starches are useful alone or in combination with synthetic polymers as comparatively inexpensive fillers, thickeners and binders. They are also used to make adhesives for wet-end and surface sizing in paper-making and paper-processing and corrugating as well as for coating and bonding paper and board, in the manufacture of composite materials and as binders in paints, adhesives, fillers, putty and coating compositions.

Known starch products have various deficiencies such as high flammability, insufficient viscosity stability, lack of water-resistance, incompatibility with synthetic polymers, lack of thermoplastic properties and, consequently, lack of heat-sealability.

There have been attempts to remedy these shortcomings. They have only been moderately successful, especially with regard to flammability and thermoplastic properties. Improvements achieved were limited, required a considerable amount of effort or were effective only in respect of one or a few desired functional properties.

The improvement in flame-resistance of starches was done in the prior art by blending and, optionally, reacting the starch with phosphates. This gave starch products which were sufficiently flame-resistant themselves, but generally were not suitable for imparting adequate flame-resistance to the materials treated with them such as papers, boards, or textiles sized, coated or finished with them or plastic materials blended with them. With respect to other properties requiring improvement, specifically heat-sealability, these products failed to give satisfactory results.

It is the object of this invention, therefore, to overcome the disadvantages of the prior art and, specifically, to provide new low-cost starch products having high flame-resistance and other desired properties such as high viscosity stability, water resistance, high bonding strength on substrates such as paper, plasterboard, glass and mineral fibers, metal and plastic materials, rigid foams, mineral boards and stone, and having thermoplastic properties, giving flexible, water-repellent, clearly transparent and heat-sealable, flame-resistant films.

The object is accomplished by reacting gelatinized starches with sulfamates. Sulfamates are commonly known flame-retardant agents which are used, for example, for making textiles and papers flame-resistant (see U.S. Pat. Nos. 2,142,116, 2,212,152 and 2,452,054 and German DE-PS No. 904 524). However, they have not previously been reacted with gelatinized starches to give products having the characteristics disclosed in the present specification.

SUMMARY OF THE INVENTION

The starch-sulfamate products of the invention obtained by reacting gelatinized starch with sulfamate have surprisingly high flame-resistance, exceedingly good viscosity stability, good compatibility with synthetic polymers, excellent bonding properties and water-resistance and are generally thermoplastic and heat-sealable.

The reaction of gelatinized starch with sulfamate is carried out in an aqueous medium at elevated temperature. If desired, the reaction product can be further processed by drying and/or incorporating a synthetic polymer.

DESCRIPTION OF THE INVENTION

Sulfamates suitable for the purposes of the invention include all alkali-sulfamates and alkaline earth sulfamates. Preference is given to ammonium sulfamate and alkaline earth sulfamates, specifically calcium sulfamate, because sulfamate starches made with alkaline earth sulfamates and, above all, calcium sulfamate, when used as or in paper glue, yield papers with no tendency to turn yellow.

The properties of the starch-sulfamate products of the invention are determined by the amount of sulfamate used in the reaction. The amount used should be within the range of 5 to 35 w/w %, more preferably 7.5 to 30 w/w % and most preferably 10 to 25 w/w %, based on starch dry substance.

With the addition of as little as 5 w/w % of ammonium sulfamate it is possible to obtain starch-sulfamate products which are not only highly flame-retardant or flame-extinguishing, but also show distinctly improved properties in film transparency and film elasticity.

When sulfamate content is about 10 to 25 w/w %, the starch-sulfamate products show good heat-sealing properties. For example, a piece of paper which has been coated with a film of this starch-sulfamate product in an amount corresponding to 10 g/m$^2$ by heating (to about 150° C.) and slight pressing can be made to stick so firmly to another piece of paper that after cooling the bond can only be separated by tearing the fibers.

Starch-sulfamate products having medium to high sulfamate content are not only flame-resistant themselves, but can be used for flame-resistant finishing. A flame-resistant board can be made, for example, by coating both sides of a board having a weight of 250 g/m$^2$ with 10 g/m$^2$ of a starch-sulfamate product having a sulfamate content of 20 w/w %.

Starch-sulfamate products with a high sulfamate content (which ranges from about 30 to 33 w/w %) are thermoplastic compositions with a softening temperature of about 120° C. Upon cooling they will solidify into hard firm bodies and when exposed to intensive heat (e.g., gas flame) will decompose giving off an odor of caramelization.

The starch-sulfamate products of the invention are chemical compounds of a previously undefined structure. In their chemical and physical properties they are distinguished from corresponding physical mixtures of pre-gelatinized starches and dry sulfamates or non-heated mixtures of starch and sulfamate solutions. The sulfamate component cannot be separated by extraction from the starch-sulfamate products of the invention.

As already indicated, the starch-sulfamate products of the invention include pure starch-sulfamate and products which, apart from starch-sulfamate, contain at least one synthetic polymer in an amount up to about 80 w/w %, based on the total weight of the finished starch-sulfamate product. Vinyl polymers are an example. Preference is given to products in which the synthetic polymer has been incorporated by polymerizing at least one vinyl monomer and/or vinyl prepolymer in situ, specifically in the presence of a starch-sulfamate serving as a protective colloid.

Starch-sulfamate products of the invention are obtained by reacting starch, chemically modified starch and/or physically modified starch, which has been pregelatinized or is being gelatinized in situ with 3–40 w/w % of at least one sulfamate (based on starch dry substance) in the presence of at least about 30 w/w % water (based on the total weight of the reaction mixture) at temperatures of about 40°–250° C.

Sulfamates, unlike other starch modifying agents, do not react well with ungelatinized starch. With dry cold-swelling starch (pregelatinized starch) there is practially no reaction either. Even mixtures of aqueous solutions of sulfamates and pregelatinized starch do not react in the cold state.

With aqueous mixtures of gelatinized starch and sulfamate, however, drying with heat can cause a reaction which yields a starch-sulfamate product having the properties required by the present invention. It has been found, however, that best results are obtained by gelatinizing the starch according to known methods, for example in batch cookers or continuous cookers or in extruders or on heated rolls, and by reacting the in situ gelatinized starch with sulfamate or a mixture of sulfamates in one process step. This indicates that chemical reactions, probably esterification, take place between the starch and the sulfamate as the starch-sulfamate products of the invention are formed. The reactions are promoted in this process embodiment of the invention because at elevated temperatures which accelerate the reaction exposure of reactive sites of the starch is caused by gelatinization in situ.

Optimum reaction temperature can be determined easily by one skilled in the art by taking into account the principles that higher temperatures will accelerate the reaction, but will also increase the likelihood of secondary or side reactions (decompositions) and that when using ungelatinized starches the gelatinization temperature has to be exceeded for a sufficient time to cause gelatinization.

The product obtained from the reaction may be used as is or may be further processed by drying and/or by incorporating a synthetic polymer. Vinyl polymers are preferred.

The amount of synthetic polymers to be incorporated in the starch-sulfamate product may exceed 80 w/w %, based on total dry substance. However, 80 w/w % is an empirical value at which the advantageous properties of the starch-sulfamates are still effective.

When making starch-sulfamate products with synthetic polymers, according to this invention, it is generally possible to incorporate the latter in the starch-sulfamate by various physical and/or chemical methods. For example, they can be blended in the dry state. We have found, however, that starch-sulfamate products with optimum properties are prepared by reacting the starch-sulfamate with the polymer(s) in a dispersion (preferably aqueous) by polymerizing suitable monomers and/or prepolymers in situ in an aqueous colloidal dispersion of a starch-sulfamate product.

A particularly simple, and therefore preferred method of manufacturing starch-sulfamate products according to this invention is to react starch with one or more sulfamate on heated rolls (which are commonly used for making cold-swelling starches) with optional in situ gelatinization. The reaction mixture can then be dried if desired. For this method, an aqueous dispersion is used having a total dry substance content of starch and sulfamate of 30–70, preferably 36–60, and most preferably 40–55 w/w %.

While the starting material suitable for the purposes of the invention may be any kind of unmodified or modified starch, preference is given to modified, specifically degraded, acylated, etherified and/or oxidized starches.

As already mentioned, the starch-sulfamate products of the invention can be used in adhesives and binders for paper, board, building materials, insulating materials, plastic materials, textiles, glass and mineral fibers, and are characterized, apart from being flame-resistant, as generally very soluble in cold water but also giving water-repellent bonds or coatings. Upon drying, as a rule, they yield clear, transparent, foldable, elastic and/or heat-sealable films. Most of them are also suitable for the manufacture of flame-retardant rigid foams and/or as thermoplastic compositions.

The examples below illustrate the invention and its advantages over prior art. Unless otherwise expressly indicated, percentages are by weight.

EXAMPLE I

A 20% suspension of an acid-modified (degraded) starch (having a viscosity of 50 millipascals in 5% aqueous solution, measured at 50° C. with a Brookfield viscosimeter, spindle 1, 20 RPM) in water was mixed with 25% ammonium sulfamate, based on starch dry substance. Then the mixture was reacted by heating for 25 minutes to 95° C. at a pH of 4.5.

EXAMPLE II 400 parts by weight of an oxidized starch (having a viscosity of 50 millipascals in a 10% aqueous solution measured at 60° C. with a Brookfield viscosimeter, spindle 1, 20 RPM) together with 80 parts by weight of ammonium sulfamate were suspended in 480 parts by weight of water. The slurry was gelatinized with a roll dryer and dried at a steam pressure of 9 bar.

The resulting flaky product dissolved easily in water at room temperature.

When dried, the solution turned into a flame-resistant, highly flexible, water-repellent, clearly transparent and heat-sealable film.

An adhesive made from 20 parts by weight of the described product by dissolving in 800 parts by weight of water showed exceedingly high viscosity stability and allowed very good flame-retardant bonding of different materials, such as paperboard to paperboard, paperboard to aluminum foils, mineral fibers and/or glass fibers, rigid foams of polystyrene, phenolic resins or polyurethane, wood, plastics, plasterboard, mineral substances and stone. This solution may also be used for sizing textile and glass fiber yarns, for finishing fabrics made from them, as an additive in formulations for protective coats of paint, for finishing packaging materials made from paper, board or wood. Material so treated is flame-retardant to flame-resistant, water-repellent and heat-sealable.

EXAMPLE III 100 parts by weight of a 30% starch-sulfamate solution, prepared as in Example I, were stirred into 100 parts by weight of a commercial grade polyvinyl acetate dispersion. The adhesive thus produced was suitable for various bondings (see Example II), set very quickly and gave flame-resistant, water-repellent and heat-sealable bonds.

EXAMPLE IV

A starch-sulfamate solution was prepared as in Example I with a dry substance of 15.4%. A conventional starter was added, followed by dosing with 37.7 w/w % of vinyl acetate monomer and polymerizing over 2½ hours at 70° C.

The PVAc dispersions thus obtained showed the following characteristics:

| | |
|---|---|
| Dry substance: | abt. 52.5%. |
| Viscosity (Brookfield sp. 3): | 10 RPM: 2,300 millipascals |
| | 20 RPM: 1,670 millipascals |
| | 50 RPM: 1,080 millipascals |
| | 100 RPM: 800 millipascals. |
| Film properties: | transparent, water-repellent, flame-resistant, heat-sealable. |

EXAMPLE V

A paper that had been impregnated with a starch-sulfamate solution, laminated or treated, for example on a size press not only showed improvements in technological values such a strength, etc., but had also become flame-resistant and water-repellent in one process.

EXAMPLE VI

This example illustrates the use of starch products of this invention for the production and treatment of paper.

(a) Surface-sizing on a size-press:

A starch-sulfamate, prepared as in Example I from native corn starch and 20% ammonium sulfate, based on starch, was dissolved in a concentration of 8%. This solution showed a viscosity at 50° C. of 50 millipascals (Brookfield, spindle 1, 20 RPM). By means of a size press the solution was applied to paper in an amount corresponding to a 3% starch product (dry substance), based on paper weight. The resulting surface-sized paper not only showed improved strength but was flame-resistant and water-repellent as well.

(b) Paper sizing by impregnating:

Paper was impregnated with a starch-sulfamate solution, prepared as in Example I, of a concentration of 20% and showing a viscosity at 50° C. of 25 mPa.s (Brookfield, spindle 1, 20 RPM), so that about 8% starch product (dry substance), based on paper weight, was absorbed by the paper. The paper thus obtained not only showed a higher strength but was also flame-resistant.

(c) Paper coating:

A coating color was prepared according to the following formula:
100 parts by weight of kaolin
12 parts by weight of latex
2.5 parts by weight of starch-sulfamate (prepared as in Example I)
0.7 parts by weight of Ca stearate
0.3 parts by weight of optical brightener
Dry substance of the coating color: 60–62%.

This coating color showed excellent rheological and film-forming properties and yielded flame-resistant and water-repellent coated papers and boards of exquisite printability.

Having set forth the general nature and some specific examples of the invention, the scope is now more particularly set forth in the following claims.

We claim:

1. A process for preparing a flame-resistant starch sulfamate product comprising contacting starch with at least one sulfamate selected from the group consisting of alkali sulfamate and alkaline earth sulfamate in an amount from 3 to 40% by weight, based on starch dry substance, in the presence of at least 30% by weight water, based on total weight of the reaction mixture, at a temperature from 40° to 250° C., followed by incorporating a synthetic polymer in the starch-sulfamate product in an amount up to 80% by weight, based on total dry substance, by polymerizing a monomer in an aqueous-colloidal dispersion of the starch-sulfamate product.

2. The process of claim 1 wherein the synthetic polymer is a vinyl polymer.

3. The process of claim 1 wherein the monomer is at least one monomer selected from the group consisting of vinyl acetate, vinyl chloride, styrene, maleic acid ester, acrylic acid ester and methacrylic acid ester.

4. The process of claim 1 wherein the starch is gelatinized prior to the reaction.

5. The process of claim 4 wherein the gelatinized starch is modified.

6. The process of claim 1 wherein the starch is modified prior to the reaction.

7. The process of claim 1 wherein the sulfamate is calcium sulfamate.

8. The process of claim 1 wherein the sulfamate is ammonium sulfamate.

9. The process of claim 1 wherein the sulfamate is present in an amount from 5 to 35% by weight, based on starch dry substance.

10. The process of claim 1 wherein the sulfamate is present in an amount from 7.5 to 30% by weight, based on starch dry substance.

11. The process of claim 1 wherein the sulfamate is present in an amount from 10 to 25% by weight, based on starch dry substance.

12. The process of claim 1 wherein the starch-sulfamate product is dried following the reaction.

13. A flame-resistant starch-sulfamate product prepared by contacting starch with at least one sulfamate selected from the group consisting of alkali sulfamate and alkaline earth sulfamate in an amount from 3 to 40% by weight, based on starch dry substance, in the presence of at least 30% by weight water, based on total weight of the reaction mixture, at a temperature from 40° to 250° C., followed by incorporating a synthetic polymer in the starch-sulfamate product in an amount up to 80% by weight, based on total dry substance, by polymerizing monomer in an aqueous colloidal dispsersion of the starch-sulfamate product.

14. The product of claim 13 wherein the synthetic polymer is a vinyl polymer.

15. The product of claim 13 wherein the monomer is at least one monomer selected from the group consisting of vinyl acetate, vinyl chloride, styrene, maleic acid ester, acrylic acid ester and methacyrlic acid ester.

16. The product of claim 13 wherein the starch is gelatinized prior to the reaction.

17. The product of claim 16 wherein the gelatinized starch is modified.

18. The product of claim 13 wherein the starch is modified prior to the reaction.

19. The product of claim 13 wherein the sulfamate is a calcium sulfamate.

20. The product of claim 13 wherein the sulfamate is ammonium sulfamate.

21. The product of claim 13 wherein the sulfamate is present in an amount from 5 to 35% by weight, based on starch dry substance.

22. The product of claim 13 wherein the sulfamate is present in an amount from 7.5 to 30% by weight, based on starch dry substance.

23. The product of claim 13 wherein the sulfamate is present in an amount from 10 to 25% by weight, based on starch dry substance.

24. The product of claim 13 wherein the starch-sulfamate product is dried following the reaction.

* * * * *